Sept. 28, 1954 L. A. LEDGETT 2,690,446
CONTROL OF CHEMICAL REACTIONS
Filed June 9, 1948

Inventor

By

Attorney

Patented Sept. 28, 1954

2,690,446

UNITED STATES PATENT OFFICE 2,690,446

CONTROL OF CHEMICAL REACTIONS

Lowell A. Ledgett, Ridgewood, N. J., assignor to Colgate-Palmolive Company, a corporation of Delaware Application June 9, 1948, Serial No. 31,861

10 Claims. (Cl. 260—400)

This invention relates to control of chemical reactions in which gas or heat or both gas and heat are liberated. A preferred embodiment relates to a method of and apparatus for manufacturing surface-active agents such as wetting, emulsifying, dispersing, penetrating and deterging agents which contain salts of organic sulphonic acids. The invention relates more particularly to improvements in the neutralization of the acid mix which facilitate maintaining the temperature of the reacting materials practically constant despite the large amount of heat liberated in the reaction, and which also facilitates removal of gas without excessive foaming if a gas-producing neutralizing agent is used.

The neutralization of organic sulphonic acids suitable for use as surface-active agents is an exothermic reaction which liberates a very substantial amount of heat. If this heat is not effectively dissipated, the temperature of the reacting mixture may rise sufficiently to cause excessive deterioration of the product, particularly if pH is not maintained closely throughout the reaction mixture by rapid complete mixing of the reactants. Serious operating difficulties may also be encountered in this and other exothermic reactions if temperature rise is not controlled. In a closed system, for example, dangerous pressures may be built up which are capable of destroying the apparatus. On the other hand, if the apparatus is not pressure-sealed, volatile components of the reaction mixture may evaporate before the reaction is complete due to the large amount of heat liberated, thus causing foaming and lack of homogeneity in the mass, which may cause additional local overheating. If carbonates or bicarbonates are used as neutralizing agents the gases evolved as reaction products cause difficulties such as interference with the operation of pumps, foaming similar to that experienced where volatile products flash off before completion of the reaction, etc.

It has heretofore been proposed to control temperatures in neutralization reactions by causing the reaction to take place in a circulating mass of the reaction products from which heat is removed through indirect heat exchangers, as shown in Muncie U. S. Patent No. 2,130,361, for example, or by immediately vaporizing one or more volatile constituents from the reaction products, as shown in the Mills U. S. Patent No. 2,187,244, for example. Where indirect cooling is used, large heat transfer surfaces are required to be fabricated from materials which are capable of withstanding corrosion by the substances employed in the reaction. When handling anomalous fluids with high "apparent viscosity," shear strength, solids in suspension, etc. and/or when controlling temperature close to that at which crystallization, solidification, congealing, etc. occurs, flash cooling is more feasible and economic than surface heat exchange. Where immediate flash cooling is employed, however, it is not possible to provide protection against flashing before completion of the reaction and such a system does not permit of close control of the pH (acidity or alkalinity) in the reaction mass. Systems employing external mixing and pumping, moreover, are not conducive to high recycle rates thru a flash cooler especially under inherent conditions of high pressure drop in piping and/or abrasion in pumps.

These and other disadvantages of prior proposals and practices are overcome by the present invention which provides an improved process and apparatus for the neutralizing step in the manufacture of synthetic surface-active agents, as will become apparent from the following detailed description and the accompanying drawings in which.

Figure 2:
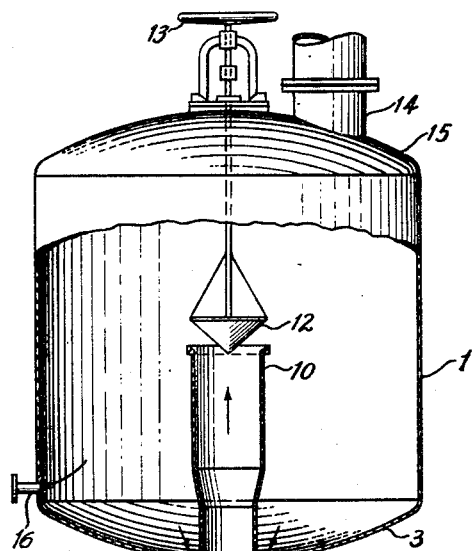
Fig. 2 is a detailed sectional elevation of a portion of the apparatus shown in Fig. 1 on a larger scale.
Figure 2:
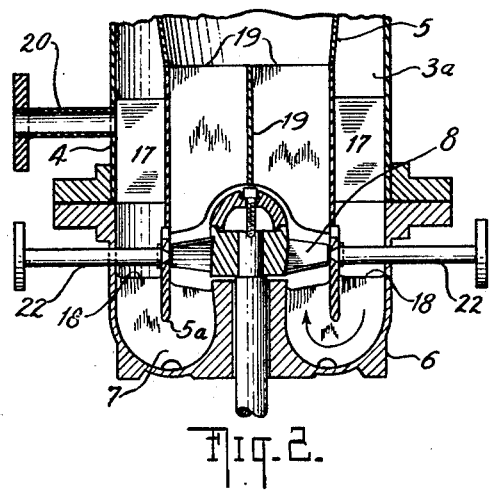

According to the present invention, the neutralization of organic sulphonic acids for the production of surface-active agents is carried out by introducing the reagents into a mechanically circulated and agitated mass of reaction product under sufficient pressure to maintain water (or other volatile components which are to be understood as embraced within the term "water" as used herein) in liquid phase until the reaction is complete whereupon the mass is discharged into a zone of lower pressure to flash off a controlled amount of water. In this way the temperature of the mass is lowered by direct heat exchange, i. e., the heat required for vaporization is abstracted directly from the mass, the composition of the final product is readily controlled and adjusted, and objectionable foaming of the fluid mass, which premature volatilization of water might cause is prevented. By proper regulation of the ratio of the recycle rate to the input rate, objectionable aeration of the mass and foaming may be prevented even when neutralizing agents are used which produce $CO_2$. A high recycle rate is made economically feasible in the present invention by passing the returning stream in indirect heat transfer relation to, and preferably surrounded by, the stream withdrawn from a body of reaction product maintained in the flash vessel.

The term "organic sulphonic acids" is meant to include those substances in which the $-SO_3H$ or $-OSO_3H$ group is attached to an organic radical and which, when neutralized, have surface-active properties and may be used as detergents, wetting, emulsifying, dispersing, penetrating agents, etc., such as, for example, sulfates and sulphonates of long chain aliphatic hydrocarbons, higher fatty alcohols, long chain fatty acids, polyhydric alcohol esters of fatty acids, alkyl ethers of polyhydroxy compounds, mixed aromatic and aliphatic hydrocarbons and the like.

The term "neutralizing agent" includes those substances capable of neutralizing organic sulphonic acids and may be taken from the group consisting of alkali metal and alkaline earth metal hydroxides and salts of these metals with weak acids such as carbonates and bicarbonates, aqueous ammonia, and organic bases such as the alkanolamines. It is generally preferred to employ caustic soda or soda ash as the neutralizing agent in the present invention where sodium salts are being manufactured.

The apparatus of the invention in which the process is preferably carried out comprises essentially an evaporator or flash cooling vessel having a vapor line communicating with the upper part thereof and a liquid circulating system having an inlet communicating with the lower part of the vessel and an outlet in the free space within the vessel a substantial distance above the inlet. A power driven impeller is provided for flowing a liquid stream of reaction product through the circulating system at a high rate and also for agitating it so that the flow is very turbulent. Pipes are provided for feeding the acid and the neutralizing agent into the circulating turbulent stream where thorough mixing is assured. The outlet of the circulating system is provided with means for varying the size of the discharge orifice whereby the pressure on the circulating mass between the impeller and the orifice can be controlled. A product discharge line is provided which may communicate either with the lower part of the vessel or the suction side of the circulating system. Preferably an automatic liquid level control is used to maintain a constant head of liquid in the vessel.

Figure 1:
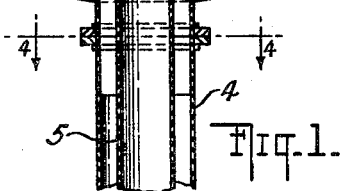
Fig. 1 is a sectional elevation of an apparatus embodying the invention for carrying out the improved neutralization reaction.

Referring now to Fig. 1 of the accompanying drawings, reference numeral 1 represents a cylindrical evaporator or flash cooling vessel adapted to maintain a fluid body of reaction products in the lower portion thereof. Vessel 1 has a flanged central outlet 2 providing passage through bottom wall 3. Secured to outlet 2 is an outer flanged draft tube 4 of such length that the annular space 3a between the outer draft tube 4 and an inner draft tube 5 creates sufficient pressure due to hydrostatic head at the lower end to keep water in liquid phase. In other words, there is a net positive suction head above vapor pressure. Secured to the lower flange of draft tube 4 is a casing 6 having a toroidal cavity 7 of substantially U-shaped vertical section. The inner draft tube 5 extends into cavity 7 but terminates short of the bight thereof so that material flowing downwardly through the annular space 3a, upon reaching the casing 6, is directed upwardly through the inner draft tube 5 which is substantially longer than outer draft tube 4 and extends into the free space of vessel 1.

The requisite force for causing motion of the stream of liquid material upwardly through the inner draft tube is provided by the motion of an impeller 8 which is keyed to the shaft of a driving motor 9. Reagents are introduced into and dispersed in the moving stream in the region of the casing 6, and in the violent turbulent stream which rises away from the impeller in the inner draft tube they are thoroughly contacted. The reaction takes place sufficiently rapidly under these conditions that it is practically completed within the inner draft tube. Since the neutralization takes place between reagents dispersed in a mass of cooled reaction product, the heat of reaction is also dispersed throughout the mass, thereby preventing localized overheating and uncontrolled pH with all their attendant disadvantages.

In the upper outlet 10 of the inner draft tube 5 is a conical head 12 which is adjustable in elevation with respect to rim 10 by means of an external wheel 13, thus providing an orifice of adjustable area. By adjusting the area of the orifice the pressure on the mass in the inner draft tube 5 can be regulated and controlled as required to prevent premature vaporization or swelling within tube 5 and also to produce the required spray action to afford surface for vaporization and/or degasification when the liquid issues into the free space in the vessel.

The stream of hot reacted material is discharged above the liquid level in the vessel 1 into a zone or region of pressure substantially reduced from that inside the draft tube 5. Upon being subjected to the reduced pressure, a controlled amount of the water carrying the reaction products is flash evaporated, absorbing the heat required for vaporization from the mass and thus serving to reduce its temperature by any desired amount.

The vessel 1 may be provided with suitable means to prevent entrainment of liquid in the vapor leaving the vessel, e. g., baffle plates or the like.

A vapor line 14 connected at the upper wall 15 of the cylindrical vessel communicates with a condensing system (not shown) which serves to maintain the absolute pressure on the system at a desired level. Finished products are removed from the system by pipe 16 which is shown near the bottom of the cylindrical wall of the vessel 1, but it is apparent that it could be located anywhere below the liquid level in vessel 1 or in the wall of the draft tube 4 any place above the level of introduction of either reactant.

The condensing apparatus used to maintain the absolute pressure, usually a vacuum, may be chosen from a large class, for example any of the types commonly used in evaporation and distillation arts and in the reduction of back pressure in steam power systems, such as surface condensers, ejector condensers, barometric condensers, siphon condensers and the like. The condenser may, if desired, be supplied with additional vacuum producing means for removing gas evolved in the reaction, for example carbon dioxide.

Referring now to Fig. 2 of the drawings, inner draft tube 5 is secured to and spaced from the bottom of outer draft tube 4 by vanes 17. The lower end 5a of draft tube 5 is preferably made separate from the tube proper and permanently mounted in casing 6 by vanes 18 which extend upwardly in the center cavity almost to the impeller 8. Above the impeller are additional vanes 19 in the inner draft tube 5.

Figure 5:
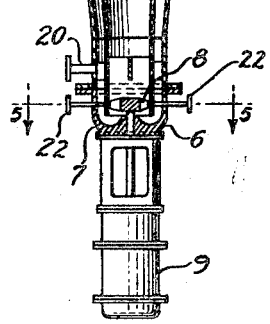
Fig. 5 is a cross-sectional view taken along the line 5—5 of Fig. 1.
Figure 5:
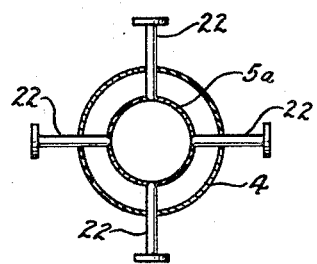

A supply line 20 is provided for introducing one of the reagents into the downflowing material in the annular space 3a. The downward flow is reversed in the toroidal cavity 7 and rotation of the fluid mass is inhibited by vanes 17, 18 and 19. This arrangement assures turbulent flow and violent agitation in the region of the impeller where the other reagent is injected through nozzles 22, (see also Fig. 5). These nozzles are shown discharging into the inner draft tube at the blade tips of the impeller 8 but they may discharge either up or down stream from the impeller provided the mass is sufficiently turbulent to effect rapid dispersal of the other reagent through the cross section of the liquid stream whereby the temperature of the mass is maintained substantially uniform notwithstanding the evolution of heat which results from the reaction.

The pressure in the inner draft tube is controllable by elevating and lowering the movable head 12. With introduction of one of the reagents upstream from and the other at or near the impeller such adjustability of process conditions insures that sufficient pressure may be maintained in the inner tube to prevent flashing prior to discharge of the volatile materials therefrom, and permits completion of the reaction under the desired condition of turbulence, temperature, pH and homogeneity.

A significant feature of the apparatus is that it makes economical and practicable a high ratio of recycle rate to input rate. One advantage of a high ratio is that an exothermic reaction can be carried out with a minimum temperature change and at the optimum temperature. In neutralizing the monosulphate of coconut oil fatty acid monoglycerides with aqueous sodium hydroxide, for example, it is desirable that the temperature of the neutralized product not substantially exceed about 110° F. By maintaining a ratio of about 60/1 it is possible to limit the temperature differential, as measured by thermometers in the space 3a and tube 5, respectively, to less than 2° F. Another advantage is that the relative volume of gas liberated in the reaction can be kept sufficiently low that the product does not foam or swell objectionably and the pumping action of the impeller is not interfered with. A further advantage is that better mixing is obtained with greater homogeneity in the reaction product.

Figure 3:
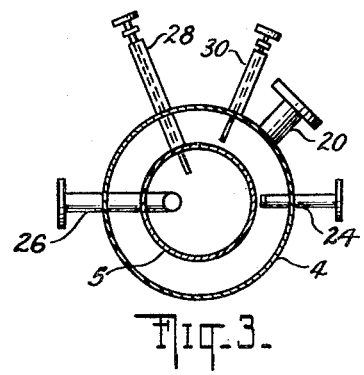
Fig. 3 is a cross-sectional view showing features which may be employed in one embodiment of the invention.

Referring now to Fig. 3 of the drawings, a supply line 24 is shown which discharges into the outer draft tube i. e., into annular space 3a, and may be used for the introduction of desired "builders," addition compounds and the like into the moving stream of reaction products. A nozzle 26 having its discharge end opening into the inner draft tube 5 may be utilized for collecting samples of the reacted material for analysis to determine the need for adjustment of the rate of introduction of any of the reagents, addition products, or the like, so as to yield a finished product of desired composition. Tubes 28 and 30 which have their discharge ends opening into the inner draft tube and the annular space, respectively, may be utilized to carry equipment such as thermometers or Bourdon tubes or diaphragm gages and the like for the measurement of temperatures and pressures in the circulating liquid stream of material.

Figure 4:
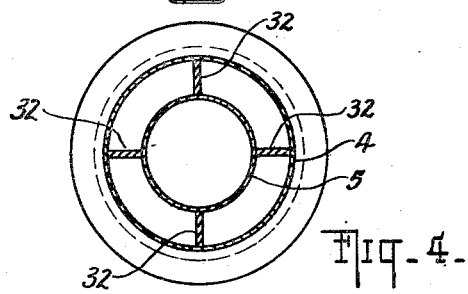
Fig. 4 is a cross-sectional view taken along the line 4—4 of Fig. 1.

Fig. 4 depicts vanes 32 which serve to maintain the position of the inner draft tube 5 within the upper end of draft tube 4.

While the points of introduction of the reagents into the system are not critical in the strictest sense, it is generally desirable to introduce at least one of the reagents at or down stream from the impeller, so that the principal reaction may take place in the region of highest turbulence and maximum pressure, where foaming and flashing are kept at a minimum and the reaction mass is maintained substantially homogeneous until the reaction is considerably advanced or completed. The streams of both the reagents may be introduced at or near the impeller or one may be introduced near or at the impeller and one upstream. Which of these methods is preferred can be dictated best by the properties of the materials involved. For example, where the acid mix to be neutralized in continuous reaction contains a substantial amount of free sulphuric acid, it is often times desirable that it be added to the stream at some distance from the impeller, to prevent the well-known deterioration which results when acids, particularly strong acids, are placed in concentrated quantities in contact with metal parts. In such cases it may be most desirable to introduce the acid upstream from the impeller so that it becomes dispersed in the downflowing stream of reaction products before reaching the impeller where the alkali may be introduced. Thus the entire region of the turbulence is utilized to the best advantage in mixing the reagents and the only material which may exist in local excess even briefly, at the impeller blade is the relatively non-corrosive alkali.

Another consideration of value to the operation exists in that some reagents are more injurious to the reaction products than others, and in view of this it may be desirable that the least harmful of these be added upstream and be permitted to mix with the circulating stream of reaction products. In the neutralization of organic sulphonic acid with aqueous caustic soda or soda ash for example, the rate of hydrolysis of certain types of organic residues in the neutralization product is considerably more rapid in the presence of alkali than in the presence of acid; hence it is advantageous to introduce the acid up stream and the alkali at the impeller.

While the contactor described is of the type which comprises an internal impeller for causing motion of the circulating fluid it should be understood that apparatus similar in effect but different in design may be employed to accomplish the same result. Thus, devices embodying the principle utilized in centrifugal pumps, as well as mechanisms of the positive-displacement variety, may be employed in place of the apparatus utilized in the lower portion of the casing 6 in Fig. 1. In any case, however, the heat transfer relation, and preferably the concentric arrangement, of the feed pipe to and the discharge pipe from the pump is an essential feature of my apparatus. With this arrangement a minimum hydrostatic head above the pumping device is required to suppress vaporization or flashing in the pump section, i. e., the required net positive suction head above the vapor pressure of the volatile component is kept at a minimum.

The following example of typical operation in accordance with the invention is included to illustrate but not to limit the invention:

1146 parts (by weight) per hour of a mixture containing approximately 50% sulfuric acid and 50% sulfated monoglyceride ester of coconut oil fatty acids are continuously introduced at 120° F. through pipe 20 of an integral contactor-flash cooler of the type shown in the drawings. 3,023 parts per hour of a caustic soda solution of approximately 21% strength are added at 100° F. through nozzles 22 and the resulting mixture of reagents and circulating reaction products subjected to the violent flow conditions in the inner draft tube resulting from the action of the impeller. 625 parts per hour of a solution containing approximately 20% tetrasodium pyrophosphate and approximately 5% sulfuric acid are added in the inner draft tube via nozzle 26, and become admixed thoroughly with the reacting mass. The reaction products are sprayed through orifice 10 in the vessel 1 where a vacuum is maintained of from 26 to 28.5 inches of mercury. 886 parts per hour of flash steam are removed to the condenser via vapor line 14, and 3,908 parts per hour of the solution in the vessel are removed by pipe 16. The rate of flow through the inner draft tube 1 is approximately 468,000 parts per hour, and the highest temperature increase in the circulating stream resulting from the heat of reaction is less than 2° F.

The term "liquid" as used herein is intended to include within its scope true solutions, colloidal solutions and suspensions of solids in a liquid vehicle.

What is claimed is:

1. The method of neutralizing an organic sulphonic acid which comprises maintaining an aqueous body of neutralized material in a vessel under sub-atmospheric pressure, continuously withdrawing a stream of said material from said body, continuously introducing streams of said acid and an aqueous alkali into said stream of material in a zone of intense mechanically induced agitation, and continuously introducing the combined stream into the space in said vessel above the level of said body through an orifice of such size that the volatile materials in said combined stream are kept in liquid phase prior to introduction.

2. The method of controlling and regulating the temperature of the product of an exothermic reaction which comprises maintaining a liquid body of reaction product in a vessel, continuously withdrawing a stream of product from said body, continuously introducing into said stream under conditions of thorough mechanical mixing the reagents for said reaction, maintaining sufficient pressure on said stream to prevent vaporization of a volitile ingredient thereof, and continuously introducing said stream into said vessel with simultaneous reduction in pressure to flash said volatile ingredient into vapor.

3. The method of controlling and regulating the temperature of the product of an exothermic reaction which comprises maintaining a liquid body of reaction product in a vessel, continuously withdrawing a stream of product from said body, continuously introducing into said stream under conditions of thorough mixing the reagents for said reaction, the ratio of the rate of flow in parts by weight per unit of time to the rate of introduction of said reagents in parts by weight per unit of time being at least about 60/1.

4. The method of controlling a chemical reaction in which gas is liberated in substantial amounts which comprises maintaining a liquid body of reaction product in a vessel, recycling product from and returning it to said body, continuously introducing into said recycle stream under conditions of thorough mixing the reagents for said reaction, the ratio of the recycle rate to the rate of introduction of said reagents being sufficiently high that the relative volume of gas liberated in the reaction to the volume of the recycle stream is so low that the product does not swell objectionably.

5. The method of controlling and regulating the temperature of the product of an exothermic reaction, said product containing a volatile constituent, which comprises maintaining a liquid body of reaction product in a vessel, withdrawing a stream of product from said body, introducing into said stream the reagents for said reaction, returning said stream after introduction of said reagents to said vessel in indirect heat transfer relation to the stream being withdrawn, and introducing said returning stream into said vessel with simultaneous reduction in pressure to effect flash vaporization of at least a portion of said volatile constituent.

6. The method of controlling and regulating the temperature of the product of an exothermic reaction, said product containing a volatile constituent, which comprises maintaining a liquid body of reaction product in a vessel, withdrawing a stream of product from said body, introducing into said stream the reagents for said reaction, returning said stream after introduction of said reagents to said vessel in indirect heat transfer relation to and surrounded by the stream being withdrawn, and introducing said returning stream into said vessel with simultaneous reduction in pressure to effect flash vaporization of at least a portion of said volatile constituent.

7. The method of neutralizing an organic sulphonic acid which comprises withdrawing a stream of reaction product from a liquid body thereof in a vessel, introducing an organic sulphonic acid and a neutralizing agent into said stream, returning to said vessel the stream and added reagents under conditions of thorough mixing in heat transfer relation to the stream being withdrawn, and cooling the materials so returned by said stream by controlled vaporization of a volatile ingredient thereof.

8. The method of neutralizing an organic sulphonic acid which comprises withdrawing a stream of reaction product from a liquid body thereof in a vessel, introducing an organic sulphonic acid and a neutralizing agent into said stream which reacts with said acid to produce a gas, the ratio of the rate of said withdrawal in parts by weight per unit time to the rate of said introduction in parts by weight per unit time being at least about 60 to 1, returning to said vessel the stream and added reagents under conditions of thorough mixing in heat transfer relation to the stream being withdrawn, and cooling the material so returned by said stream by controlled vaporization of a volatile ingredient thereof.

9. The method of neutralizing an acid with a neutralizing agent which yields a gaseous by-product which comprises introducing the acid and neutralizing agent into a stream of reaction product at a rate in parts by weight per unit time less than about 1/60 the rate of said stream.

10. The method of neutralizing an organic sulphuric acid reaction product which comprises maintaining a body of neutralized organic sulphuric reaction product in a vessel only partially filled thereby, continuously withdrawing an annular stream of said neutralized product in a downwardly direction and returning said stream upwardly into said vessel above the level of said body of said neutralized product through said annular stream and separated therefrom only by a heat conducting barrier whereby the upwardly flowing stream is in indirect heat transfer relation to the downwardly flowing annular stream, mechanically agitating the material in said stream and applying the force for circulating the same in the vicinity of the zone where the direction of flow is reversed, introducing streams of the organic sulphuric acid reaction product and a neutralizing agent into the circulating stream in the vicinity of said zone, maintaining sufficient pressure on said upwardly flowing stream to maintain a volatile constituent in liquid phase, and introducing said returning stream into said vessel with simultaneous reduction in pressure to effect a flash vaporization of said volatile constituent.

References Cited in the file of this patent

UNITED STATES PATENTS

| Number | Name | Date |
|---|---|---|
| 1,404,709 | Allbright | Jan. 24, 1922 |
| 1,444,255 | Lidholm | Feb. 6, 1923 |
| 1,603,308 | Ambruster | Oct. 19, 1926 |
| 2,187,244 | Mills | Jan. 16, 1940 |
| 2,210,175 | Muncie | Aug. 6, 1940 |
| 2,290,167 | Datin | July 21, 1942 |
| 2,325,320 | Holuba | July 27, 1943 |
| 2,412,679 | Grubb et al. | Dec. 17, 1946 |
| 2,422,128 | Percy | June 10, 1947 |
| 2,438,204 | Castner | Mar. 23, 1948 |
| 2,477,383 | Lewis | July 26, 1949 |
| 2,594,875 | Condit | Apr. 29, 1952 |